(12) United States Patent
Oda et al.

(10) Patent No.: US 8,613,560 B2
(45) Date of Patent: Dec. 24, 2013

(54) OPTICAL CONNECTOR PLUG

(75) Inventors: Nobuhiko Oda, Tokyo (JP); Isao Yamauchi, Tokyo (JP); Kohsuke Ishikawa, Tokyo (JP)

(73) Assignee: Adamant Kogyo Co., Ltd., Tokyo (JP)

( * ) Notice: Subject to any disclaimer, the term of this patent is extended or adjusted under 35 U.S.C. 154(b) by 96 days.

(21) Appl. No.: 13/258,253

(22) PCT Filed: Apr. 26, 2010

(86) PCT No.: PCT/JP2010/002973
§ 371 (c)(1),
(2), (4) Date: Sep. 21, 2011

(87) PCT Pub. No.: WO2010/125788
PCT Pub. Date: Nov. 4, 2010

(65) Prior Publication Data
US 2012/0020625 A1    Jan. 26, 2012

(30) Foreign Application Priority Data

Apr. 30, 2009  (JP) ................................. 2009-125803

(51) Int. Cl.
*G02B 6/36*  (2006.01)

(52) U.S. Cl.
USPC ................................. 385/78; 385/60; 385/72

(58) Field of Classification Search
None
See application file for complete search history.

(56) References Cited

U.S. PATENT DOCUMENTS 6,293,710 B1   9/2001  Lampert et al.
2005/0232550 A1*  10/2005  Nakajima et al. ............... 385/60

FOREIGN PATENT DOCUMENTS

| JP | A-5-323149 | 12/1993 |
| JP | A-10-039145 | 2/1998 |
| JP | A-2002-250840 | 9/2002 |
| JP | B2-3569488 | 6/2004 |
| JP | A-2006-091404 | 4/2006 |

OTHER PUBLICATIONS

May 25, 2010 International Search Report issued in International Patent Application No. PCT/JP2010/002973.

* cited by examiner

*Primary Examiner* — Jerry Rahll
(74) *Attorney, Agent, or Firm* — Oliff & Berridge, PLC

(57) ABSTRACT

An optical connector plug is comprised of a pair of divided front and rear housings formed generally in a quadrilateral tubular shape for receiving a ferrule to hold an optical fiber. A housing, one of the housings is provided with engagement openings on at least opposite wall portions thereof, and the other housing is provided with engagement projections on its opposite wall portions to be engaged in the engagement openings. Furthermore, fitting projections are formed in the longitudinal direction on the wall portions in which the engagement openings are formed, and fitting recesses to be fitted with the fitting projections are formed in the wall portions on which the engagement projections are formed. The pair of housings are firmly joined to each other by engaging the engagement projections with the engagement openings and by fitting and engaging the fitting projections in the fitting recesses.

13 Claims, 5 Drawing Sheets

Fig. 5

| | Results of Tests | Weight (1.25kg) |
|---|---|---|
| Present invention | Example 1 | ○ |
| | Example 2 | ○ |
| | Example 3 | ○ |
| | Example 4 | ○ |
| | Example 5 | ○ |
| | Example 6 | ○ |
| | Example 7 | ○ |
| | Example 8 | ○ |
| | Example 9 | ○ |
| | Example 10 | ○ |
| Conventional articles | Comparative example 11 | ○ |
| | Comparative example 12 | × |
| | Comparative example 13 | × |
| | Comparative example 14 | △ |
| | Comparative example 15 | × |

OPTICAL CONNECTOR PLUG

TECHNICAL FIELD

The present invention relates to an optical connector plug which is utilized for transmitting and receiving of optical signals, and for optical measuring, or the like, and relates particularly to an optical connector plug which is suitable for an optical attenuator formed one end as a plug engagement portion and the other end as an adopter engagement portion.

BACKGROUND OF THE INVENTION

Recently, in systems of optical communication technologies, effectiveness such as low loss of optical signals, broadband properties and operability is increasingly desired to be improved. It has been widely known that optical fiber connectors (also, called optical connector plugs) are utilized as connecting terminals for transmitting and receiving optical signals as such optical communication. When a problem such as an excessive light-receiving level of optical signals occurs owing to a short optical transmission distance, optical attenuators are commonly utilized for transmitting and receiving optical signals together with such the optical fiber connectors.

An optical fiber connector having a generally known structure was disclosed in FIG. 1 of Japanese Patent No. 3569488, for example. Such a connector includes housings which are constituted with a front plug body (i.e., a plug housing) and a rear extension cap as being integrally assembled in the front-rear direction, and a ferrule assembly equipped with a ferrule attached is accommodated at the inside thereof. The plug body includes key grooves (i.e., engagement openings) at opposite sides thereof, and the rear extension cap includes keys (i.e., engagement projections) formed at the respective sides corresponding to the engagement openings. The plug body and the rear extension cap are mechanically coupled by performing snap-fastening from the inside of the plug body between the engagement openings of the plug body and the engagement projections of the rear extension cap with sliding and engaging between the plug body and the rear extension cap.

Japanese Patent Application Laid-Open No. 2002-250840 shows in FIG. 1 an optical fiber connector in which a similar assembling manner with the housings of the optical fiber connector of Japanese Patent No. 3569488 is illustrated. Similarly to the above related art, an optical fixed attenuator of the embodiment disclosed in this related technology suggests in the same drawing mechanical join by snap-fastening between the engagement openings and engagement projections of two front and rear housings.

Drawings described later illustrate specific structural instance of snap-fastening structures which are adapted in the related art regarding the above conventional optical connectors. In this instance, optical connector plugs as optical fixed attenuators are illustrated.

Transformed examples of the optical connector plugs of the related art as the optical fixed attenuators which have a traditional snap-fastening structure are illustrated in FIGS. 6 and 7.

A front plug housing 31 has a quadrilateral cylinder or tubular shape and is molded with a resin such as polyetherimide (PEI). A latch 31a is disposed to the upper part thereof and openings to which a ferrule is inserted are formed respectively at front and rear sides of the cylinder. Here, a wall thickness at the openings of the front plug housing 31 is 0.45 mm. Engagement grooves, that is, engagement openings 31b, 31b, are formed respectively at both side surfaces of the cylinder. Meanwhile, a rear extension cap 32 has a quadrilateral engagement portion 32a having dimensions of a shape corresponding to the quadrilateral opening at the rear end of the front plug housing 31 at one side and an opening to accommodate an optical connector at the other side. Engagement projections 32d, 32d to be engaged respectively with the engagement openings 31b, 31b are integrally molded with the resin which is similar to the resin stated above, at both side surfaces 32c, 32c of the quadrilateral engagement portion 32a in a projected manner.

When a barrel ferrule assembly 33 to be an optical attenuator is accommodated in the front plug housing 31 and the quadrilateral engagement portion 32a of the rear extension cap 32 is assembled, snap-engagement is carried out between the engagement openings 31b, 31b and the engagement projections 32d, 32d, and both of the housings are mechanically and integrally coupled as illustrated in FIG. 7. During the coupling process of the both, the engagement projections 32d, 32d enter and widen elastically the quadrilateral openings of the front plug housing 31 from the inner surface thereof. Here, dust caps 34, 35 are disposed at the optical connector plug to protect ferrule end surfaces.

CITATION LIST

Patent Documents

Patent document 1: Japanese Patent No. 3569488
Patent document 2: Japanese Patent Application Laid-Open No. 2002-250840

SUMMARY OF THE INVENTION

Problems to be Solved by the Invention

An optical connecting adopter is to be attached to a panel etc. of an apparatus. An optical connecting plug to which an optical fiber cable is connected, is fitted with the optical connecting adopter from one side of the panel and another optical connector plug to which another optical fiber cable is connected, is fitted with another opening portion of the optical connecting adopter from the other side of the panel, so that optical connection can be performed between the both fiber cables. Further, by disengaging the fitting of the optical connecting adopter from each optical connector plug, it is possible to disconnect the optical connection therebetween.

In such the optical connector plug, as an example, FIG. 6 illustrates a latch 31a which is disposed to lock the optical connecting adopter in a fitted state. Normally, with regard to the latch 31a, a lock projection formed at a frame of a counterpart optical connector plug is engaged with a receiving recess of the optical connecting adopter as being inserted thereto. Further, normally, the counterpart optical connector plug is provided with a lock release member (i.e., a trigger lever) which is attached to the outer circumference of the plug frame and is capable of movement in the axis direction i.e., capable of cramming therein and elastically moving downward to release the engagement of the latch 31 with the lock projection (refer to FIG. 4A of Japanese Patent No. 3569488 and FIG. 2 of Japanese Patent Application Laid-Open No. 2002-250840).

As described above, the optical connector plug is structured to perform engagement and disengagement as needed with an interface such as an adopter. Further, components thereof are structured in consideration of easiness of assembling. When being assembled into a system apparatus, the optical connector plug is connected to the interface such as an I/O panel of the apparatus. Here, the connecting portion thereof is generally located at a rear end surface of an apparatus. In order to downsize the apparatus or to conserve arrangement space of the apparatus, there is a desire to reduce a space of the rear end surface by any means. Further, during handling at a connection site, laying of a cable in a small space is frequently performed. Accordingly, there may be a case that unforeseen force which is not expected is exerted to an optical connector plug 30 in directions of the right, left, top and bottom during connecting operation. A strain force is unavoidably exerted to the engagement portion between the front plug housing 31 and the rear extension cap 32. Therefore, it is supposed that that engagement between the engagement opening and engagement projection which locks them, is frequently released, and that optical communication becomes impossible. However the optical connector plug operates normally in ordinary cases, further improvement is desired. Further, if the both coupling portions are coupled with adhesive to reinforce the coupling portions, there are disadvantages that assembling worker-hour and component count are increased and cost is increased accordingly.

Then, the inventers have obtained an optical connector plug having a structure with high reliability as described below without increasing component count as a result of continuous seeking for an appropriate design while considering the above situations and possibilities.

Means to Solve the Problems

In order to address the above issues, the present invention is devised so as to overcome the unforeseen circumstances of traditional optical communication. In an optical connector plug of the present invention, a main portion is constituted with housings which is comprised of a pair of first and second matters to accommodate a ferrule holding an optical fiber and which are shaped as an approximately quadrilateral cylinder or tube as being divided into the front and rear. Here, engagement openings are formed at least at both side surfaces of the first housing, and engagement projections to be engaged with the engagement openings are formed at the distal end section of the second housing. In addition, fitting projections are formed respectively at wall portions of the first housing corresponding to the engagement openings along the longitudinal direction, and fitting recesses to be fitted with the fitting projections are formed at the second housing.

Further, the present invention provides an optical connector plug in which the ferrule is an optical fixed attenuator having an attenuating fiber.

Effects of the Invention

According to the structure of the optical connector plug of the present invention, the main portion of the optical connector plug is constituted with the pair of first and second members which are divided into the front and rear. Here, the first housing includes the engagement openings, and the second housing includes the engagement projections which are surely engaged with engagement openings of the first housing. In addition to the engagement openings and the engagement projections, the fitting projections are formed respectively at the wall portions of the first housing along the longitudinal direction and the fitting recesses being fitted portions to be fitted with the fitting projections are formed at the second housing. In this manner, a double engagement structure is obtained. Accordingly, the both housings are interdigitated and are maintained in a stable connection state without being separated even with force exerted in the direction perpendicular to a cable as with large displacement of an optical fiber cable. Further, excellent effects such as flush join surface of the first and second housings and design capability for a small space at an apparatus rear portion are obtained with the above mentioned simple structure.

BRIEF DESCRIPTION OF THE DRAWINGS

FIG. 5 is a table indicating results of respective engagement strength tests of optical connector plugs of the present invention and traditional structures.

DETAILED DESCRIPTION OF THE PREFERRED EMBODIMENTS

In the following, optical connector plugs according to the present invention will be described in detail as referring to embodiments based on a structure of an LC-type optical fixed attenuator with reference to FIGS. 1 to 5. However, it is not limited to the embodiments, and the present invention can be naturally adopted to any other technologies which belong to the spirit of the present invention. That is, the present invention can be adopted to all of optical connector plugs such as MU type and LC type optical connector plugs in the same manner.

Figure 1:
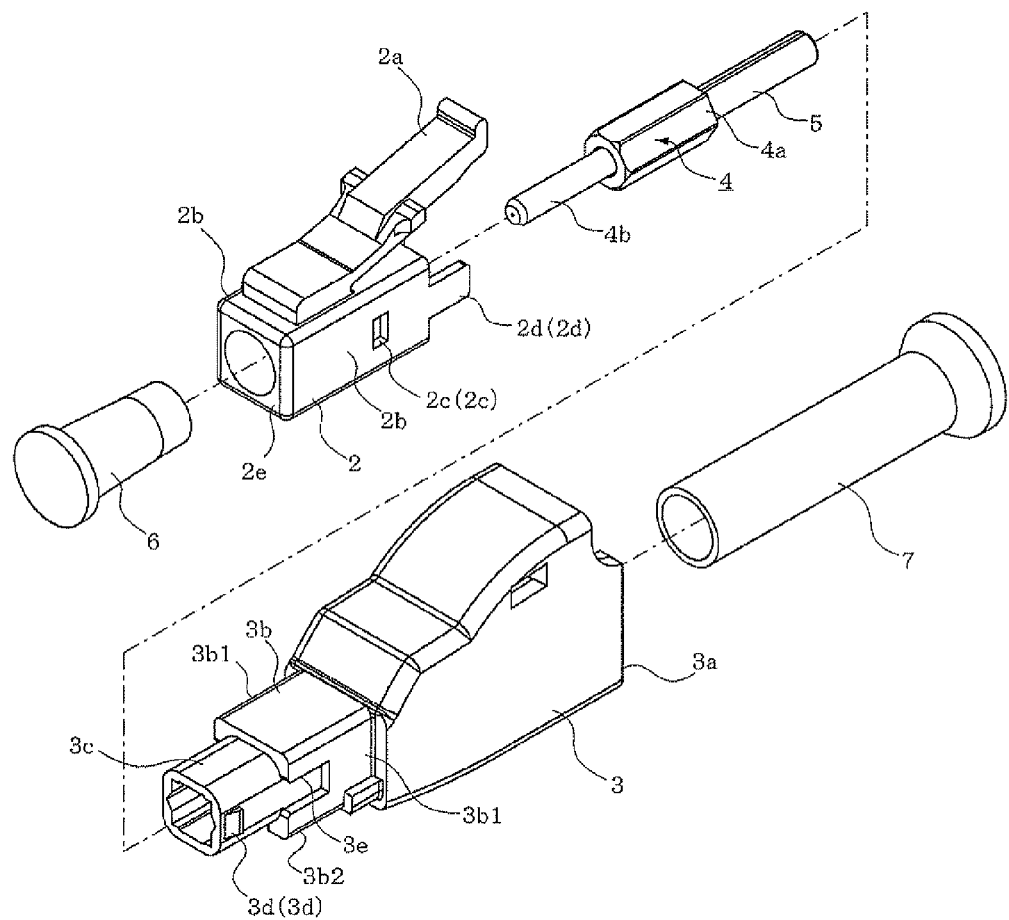
FIG. 1 is an exploded perspective view of an optical connector plug of a first embodiment according to the present invention.
Figure 2:
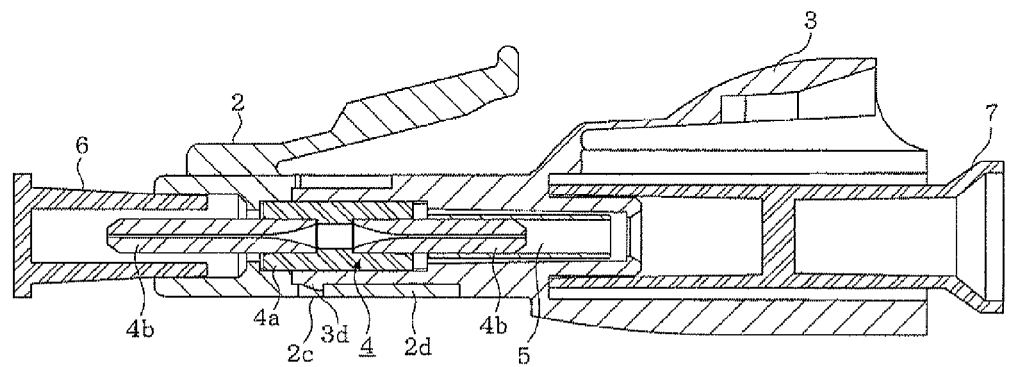
FIG. 2 is a longitudinally sectional side view at a time of assembling the optical connector plug of FIG. 1.
Figure 3:
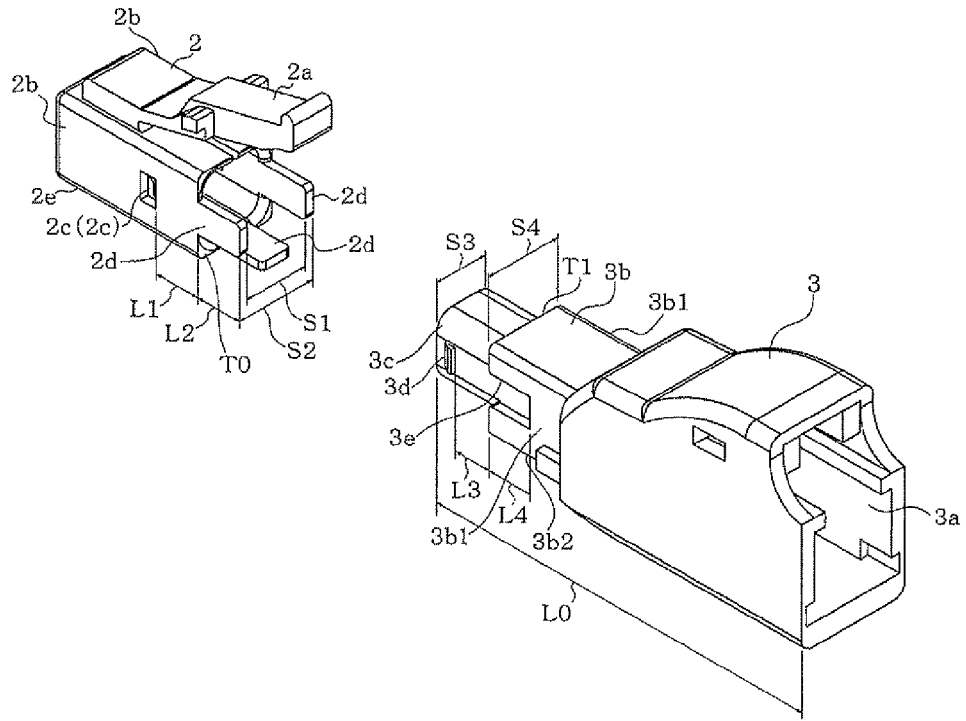
FIG. 3 is a schematic perspective view showing a front plug housing and a rear extension cap of the optical connector plug of FIG. 1.
Figure 4:
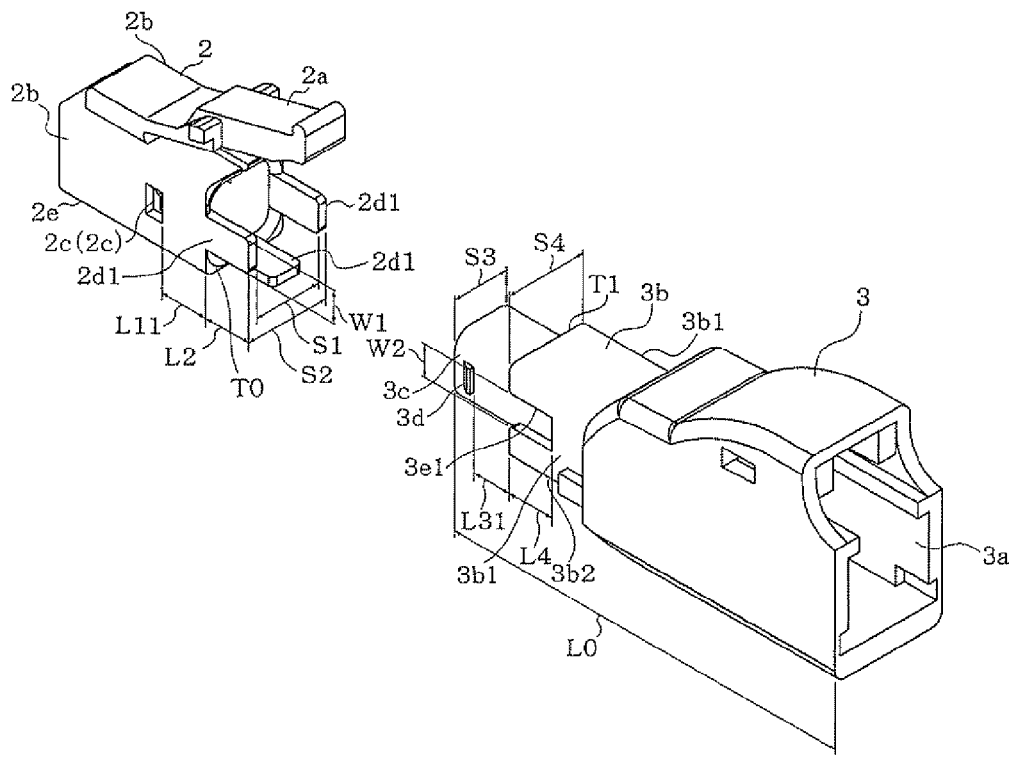
FIG. 4 is a schematic perspective view showing a front plug housing and a rear extension cap as illustrating an optical connector plug of a second embodiment according to the present invention.
Figure 6:
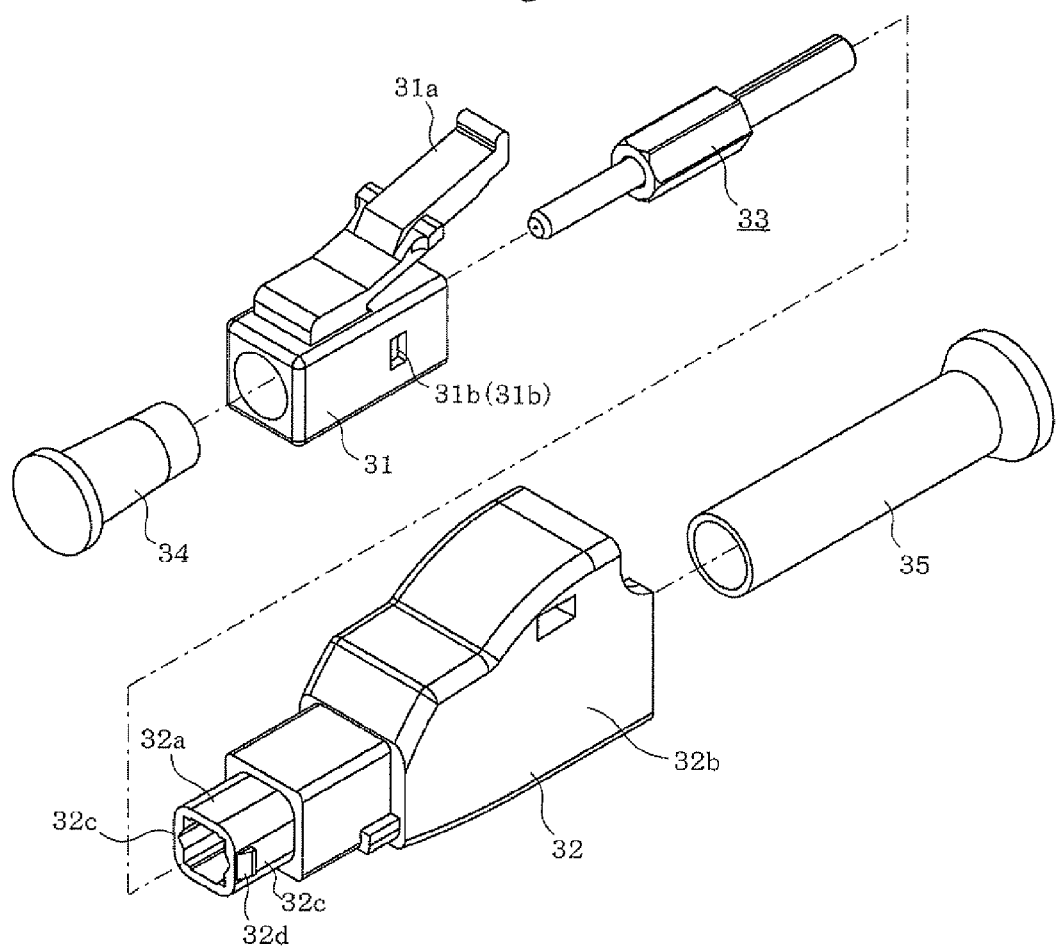
FIG. 6 is an exploded perspective view of a transformed example of an optical connector plug having a traditional snap-fastening structure of the related art.
Figure 7:
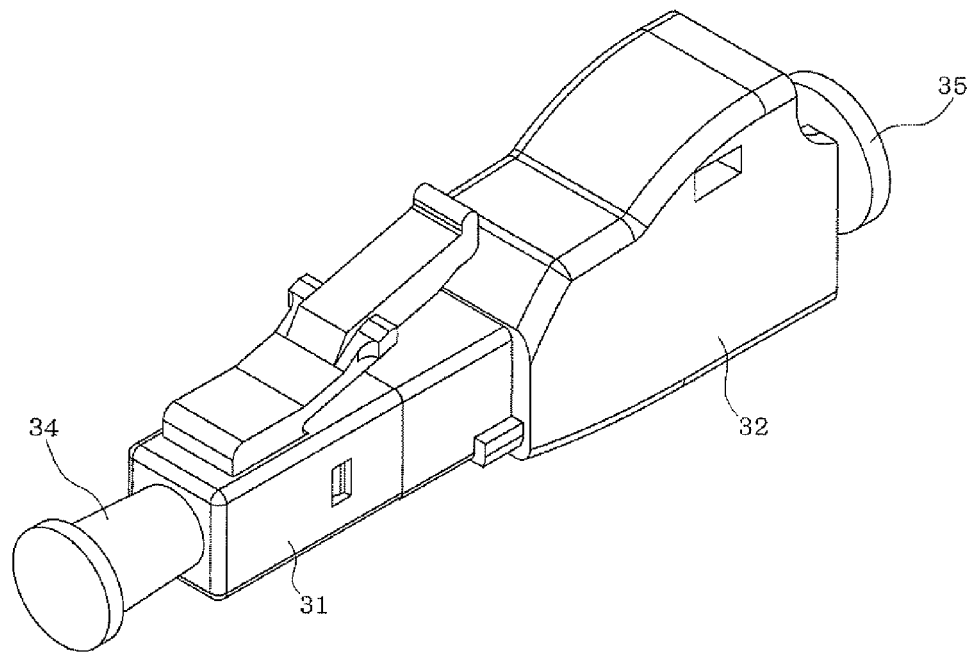
FIG. 7 is an external perspective view of the transformed example of the optical connector plug having the traditional snap-fastening structure.

FIG. 1 is an exploded perspective view of an optical connector plug of a first embodiment according to the present invention. FIG. 2 is a longitudinally sectional view of the optical connector plug according to the present invention of FIG. 1. FIG. 3 is a schematic perspective view of a front plug housing and a rear extension cap. FIG. 4 is a schematic perspective view of an optical connector plug of the second embodiment according to the present embodiment. FIG. 5 is a table indicating results of engagement strength test of the optical connector plugs of the present invention and comparative examples having a traditional structure.

As illustrated in FIGS. 1 and 2, a main portion of an optical connector plug 1 of the first embodiment according to the present invention is comprised of a front plug housing 2 as a first housing and a rear extension cap 3, i.e. a rear expansion cap as a second housing. For example, each housing is integrally formed of PEI with injection molding as being similar to the related art. The both are assembled to be integral as holding a barrel ferrule assembly 4 to be an attenuator at the inside thereof.

EXAMPLES

As illustrated in FIG. 3, the front plug housing 2 formed cylindrical as having an approximate quadrilateral sectional shape of which entire thickness is approximate 0.45 mm while an external length S2 is approximately 4.5 mm long and an internal length S1 is approximately 3.6 mm long. An latch 2a being elastically displaceable in the vertical direction is disposed to an upper surface of the housing and engagement openings 2c, 2c are respectively arranged at predetermined portions of both side surface, that is, both side walls 2b, 2b. Further, as illustrated in FIG. 2, an engagement opening 2c is arranged at a predetermined portion of a bottom wall of the front plug housing 2 as similarly to the engagement openings at the side walls.

Fitting projections 2d, 2d are formed as being extended in the longitudinal direction from quadrilateral opening ends of the both side walls of the front plug housing 2. Further, a fitting projection 2d is formed as similarly being extended in the longitudinal direction from the opening end of the bottom surface, that is, the bottom wall 2e. The fitting projections 2d, 2d, 2d have predetermined width and length as being swelled radially inward from an inner surface of each wall. The distance from a join surface T0 between the front plug housing 2 and the rear extension cap 3 to the engagement openings 2c, 2c and the distance from the join surface T0 to distal ends of the engagement projections 2d, 2d, 2d, that is, lengths L1, L2, are set to be approximately the same as being 2.5 mm, as an example. In other words, the length of the fitting projections is to be L1+L2. In this manner, when the distance from the join surface T0 to the distal ends of the fitting projections 2d, 2d is set long, that is, the length of the fitting projections 2d, 2d projected from the join surface T0 is set long, the length of the fitting with the fitting recesses 3e, 3e formed at the rear extension cap 3 can be set long as well. However, since the dimension of the plug itself is substantially small, it is preferable that at least the dimension L2 is secured to be set long as much as possible. More specifically, it is preferable to satisfy a formula of "L1<L2".

Regarding the structure of the barrel ferrule assembly 4 which is attached to the optical connector plug of the present invention, base sections of two front and rear ferrules 4b, 4b are assembled to both sides of the inside of a sleeve 4a and sections at distal sides extended from the base sections of a main body of the ferrules 4b, 4b are projected from the sleeve 4a. The barrel ferrule assembly 4 is integrally constituted with a pair of front and rear ferrules 4b, 4b which hold an attenuation fiber such as an ion dope fiber via the sleeve 4a. A split sleeve 5 is externally fitted with one of the ferrules 4b.

Meanwhile, as similarly illustrated in FIG. 3 along with the front plug housing 2, the rear extension cap 3 formed cylindrical as a whole as having a quadrilateral sectional shape is set so that the entire length L0 is 23.4 mm, for example. The rear extension cap 3 is integrally constituted with a connector accommodation portion 3a being a main portion of the rear extension cap 3, an extension portion 3b projected (i.e., extended) from a front section of the connector accommodation portion 3a, and a coupling portion 3c which is projected from the extension portion 3b to be inserted to the opening portion of the front plug housing 2. The extension portion 3b extended frontward from the connector accommodation portion 3a is formed to have an approximate quadrilateral shape of which external length width S4 is 4.5 mm and of which length is 5.2 mm. The coupling portion 3c which is continuously formed from the distal end of the extension portion 3b to be intimately fitted with the approximately quadrilateral opening portion of the front plug housing 2 is formed to have an approximate quadrilateral shape of which small external length width S3 is 3.5 mm. A pair of engagement projections 3d, 3d which perform snap-engaging with the both engagement openings 2c, 2c of the front plug housing 2 are formed at the end sections of both of the side surfaces of the coupling portion 3c. For example, the height of the projections 3d, 3d is approximate 0.2 mm. Similarly to the fitting projection 2d disposed to the distal end of the side wall, an engagement projection 3d projected toward the outer-lower side is formed at the distal end section of the bottom wall of the coupling portion 3c, and then, is engaged with the engagement opening 2c formed at the bottom wall of the front plug housing 2, as illustrated in FIG. 2. The engagement projections 3d, 3d at the side walls and the engagement projection 3d at the bottom wall of the rear extension cap 3 are engaged and joined respectively with the engagement openings 2c, 2c at the side walls and the engagement opening 2c at the bottom wall of the front plug housing 2, so that the front plug housing 2 and the rear extension cap 3 are joined appropriately and surely.

The fitting recesses 3e, 3e, 3e are formed in the longitudinal direction to be flush respectively at outer side surfaces 3b1, 3b1 of the both side walls and an outer side surface 3b2 of the bottom wall of the extension portion 3b of the rear extension cap 3 and outer side surfaces of the both side walls and an outer side surface of the bottom wall of the coupling portion 3c of the rear extension cap 3. The fitting recesses 3e, 3e, 3e are set to have the same length as that of the fitting projections 2d, 2d, 2d of the front plug housing 2, so that the both are allowed to be mutually engaged and fitted to be intimately joined. That is, the length of the fitting recess 3e of the rear extension cap is to be L3+L4 as L3 denoting the distance (i.e., the length) from a join surface T1 of the rear extension cap 3, which is engaged with the front plug housing 2, to an inner end of the engagement projection 3d arranged at the outer end section of the coupling portion 3c and, as L4 denoting the distance (i.e. the length) from the join surface T1 to a dead or inner end of the fitting recess 3e. The lengths L3, L4 are set to be approximately the same as being 2.5 mm, as an example. The length L1 is set to be the same as the length L3 and the length L2 is set to be the same as the length L4.

As illustrated in FIG. 3, when the length between the both inner side surfaces of the both side walls 2b, 2b is denoted by S1 and the length between the both outer side surfaces of the both side walls 2b, 2b is denoted by S2, the thickness of the fitting projection 2d of the front plug housing 2 is to be a half of difference between S2 and S1 as being "(S2−S1)/2". Here, the depth of the fitting recess 3e of the rear extension cap 3 is set to be the same as the half of the difference S2−S1. Accordingly, when the fitting projection 2d is fitted with the fitting recess 3e, a flush surface is obtained as illustrated in the sectional view of FIG. 2.

Here, the external width S3 of the coupling portion 3c of the rear extension cap 3, that is, the length between the outer side surfaces of the both side walls of the coupling portion 3c, is set to be the same as the length between the inner side surfaces of the both side walls of the front plug housing 2. Further, the length between the outer side surfaces of the upper and lower walls of the coupling portion 3c is set to be the same as the length between the upper and lower inner walls of the front plug housing 2. Accordingly, when the rear extension cap 3 is engaged with the inside of the front plug housing 2, an intimate join of the both can be achieved with too little gap therebetween in cooperation with fitting between the fitting recess 3e of the rear extension cap 3 and the fitting projection 2d of the front plug housing 2.

Further, the length S4 between the outer side surfaces of the both side walls of the extension portion 3b of the rear extension cap 3 is set to be the same as the length, i.e., S2 between the outer side surfaces of the both side walls of the front plug housing 2. In addition, the length between the outer side surfaces of the upper and lower walls of the extension portion 3b is set to be the same as the length between the outer side surfaces of the upper and lower walls of the front plug housing 2. When the front plug housing 2 and the rear extension cap 3 are engaged, outer surfaces of the both are to be flush without causing any stepped portion. Accordingly, it is possible to prevent something around the optical connector plug from getting caught on the front plug housing 2 and the rear extension cap 3, so that unforeseen accidents can be prevented.

As described above, when the barrel ferrule assembly 4 is accommodated in the front plug housing 2, and the coupling portion 3c of the rear extension cap 3 is inserted to the quadrilateral opening thereafter, the engagement projections 3d, 3d, 3d are snap-engaged with the engagement openings 2c, 2c, 2c as entering while elastically enlarging or widening the opening, and at the same time the fitting projections 2d, 2d, 2d are engaged and fitted respectively with the fitting recesses 3e, 3e, 3e. In this manner, the assembling is performed as illustrated in FIG. 2. As a result of this assembling, the outer surface of the front plug housing 2 and the outer surface of the extension portion 3b of the rear extension cap 3 become flush state.

Owing to the structure of assembling mentioned above, i.e., the assembled construction of the front plug housing 2 and the rear extension cap 3, the snap-fastening due to the engagement in the longitudinal direction can be maintained at the join portion. Meanwhile, in the upper-lower and right-left directions (including the circumferential direction), the both are coupled strongly and surely owing to interdigitated or fitting of the fitting projections 2d, 2d, 2d respectively with the fitting recesses 3e, 3e, 3e in addition to performing the join between the opening portion of the front plug housing 2 and the coupling portion 3c of the rear extension cap 3. Accordingly, disengagement between the front plug housing 2 and the rear extension cap 3 can be avoided.

As illustrated in FIG. 4, in an optical connector plug of the second embodiment according to the present invention, the structure of the fitting projections and fitting recesses is modified from that of the first embodiment of the present invention of FIGS. 1, 2 and 3. The remaining structure is adopted without modification. Therefore, regarding the structure of the second embodiment of the present invention, description will be made on fitting projections of a first member and fitting recesses of a second member and the above description of first embodiment will be incorporated for in the remaining structure.

A fitting projection 2d1 of a first member 2 is projected from the join surface T0 formed together with a wall end of the opening portion of a second member 3, in the longitudinal direction toward the second member 3. Further, a fitting recess 3e1 of the second member 3 is formed at the outer wall of the extension portion 3b which is formed between the connector accommodation portion 3a which is a main portion of the second member 3 and the coupling portion 3c in the longitudinal direction from an end at the coupling portion 3c side. When both of the first member 2 and the second member 3 are assembled, the fitting projection of the first member 2 and the fitting recess of the second member are fitted. Accordingly, both of the first member 2 and the second member 3 are firmly interdigitated and joined.

For example, the fitting projection 2d1 of the first member 2 is formed respectively at both side walls and the fitting recess 3e1 of the second member 3 is formed respectively at both side walls of the extension portion 3b as corresponding thereto.

Further, the fitting projection 2d1 of the first member 2 can be formed at the bottom wall and the fitting recess 3e1 of the second member 3 can be formed at the bottom wall of the extension portion 3b as corresponding thereto.

Here, the engagement opening 2c is formed behind the fitting projection 2d1 of the first member 2. The engagement projection 3d corresponding to the engagement opening 2c of the first member 2 is formed at the front end portion of the coupling portion 3c in front of the fitting recess 3b of the second member 3. Both of the first member 2 and the second member 3 can be surely joined owing to the engagement between the engagement opening 2c and the engagement projection 3d, and by the interdigitation and fit between the fitting projection 2d1 and the fitting recess 3e1.

The first member 2 and the second member 3 are formed respectively in an approximately quadrilateral shape. Here, the length L2 of the fitting projection 2d1 is the same as the length L4 of the fitting recess 3e1 and the width W1 of the fitting projection 2d1 is the same as the width W2 of the fitting recess 3e1. Further, the thickness of the fitting projection 2d1 (i.e. a half of the difference of S2–S1) is the same as the depth of the fitting recess (i.e., a half of the difference of S4–S3). Accordingly, when the fitting projection 2d1 and the fitting recess 3e1 are fitted, the outer wall surfaces of the both members at the join portion are to be flush. Here, the length L11 from the join surface T0 of the first member 2 to the front end of the engagement opening 2c is the same as the length L31 from the boundary between the coupling portion 3c of the second member 3 and the extension portion 2b to the engagement projection 3d. Accordingly, when the first member 2 and the second member 3 are engaged, the coupling portion 3c of the second member is firmly fitted into the first member 2.

As described for the first embodiment, in the second embodiment as well, the connector accommodation portion 3a is arranged so that the ferrule assembly equipped with ferrules attached at the inner walls of the opening portions of the first member 2 and the second member 3 in the longitudinal direction is firmly attached thereto. Further, a stopper which is to be engaged with the ferrule assembly equipped with the ferrules attached is disposed to the radial inside of a predetermined portion of an inner wall surface of the first member 2 so as to hold the ferrule assembly 4 at a predetermined position.

As a result of this assembling, one ferrule 4b of the barrel ferrule assembly 4 is coupled with a receptacle and the like as being projected from one end of the front plug housing 2 and the other ferrule 4b is coupled to a ferrule of another optical connector plug via the sleeve 5. In this manner, a predetermined attenuation amount can be obtained. Here, numerals 6 and 7 in the drawings are dust caps.

Figure 8:
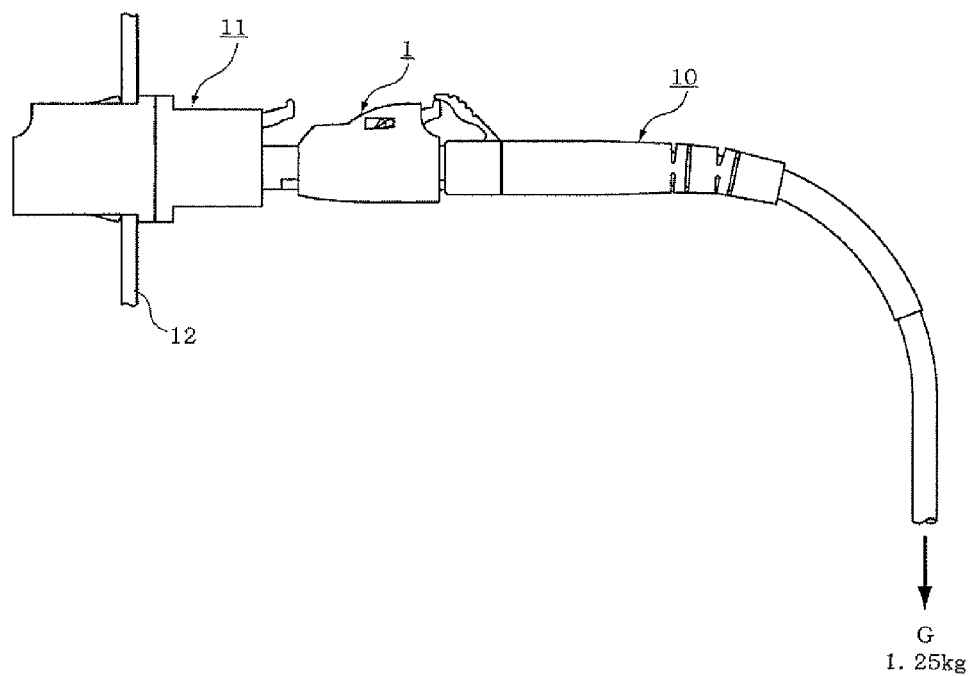
FIG. 8 is a schematic explanatory view illustrating a state of a strength test of an optical connector plug.

The optical connector plug 1 assembled as illustrated in FIG. 2 is used as being connected into an adopter 11 of an I/O panel 12 of a connecting apparatus as illustrated in FIG. 8. To reduce an attaching space, there may be a case that an optical connector plug 10 for inputting connected to the optical connector plug 1 is forcefully folded to be orthogonal when unforeseen large force is applied and is pulled in the direction of arrow G in FIG. 8. With the optical connector plug 30 in the related art, there has been a little possibility that the front plug housing and the rear extension cap are disconnected owing to the tension force. However, by adopting the structure of the optical connector plug 1 of the present invention, a strong join state between the both can be maintained while eliminating phenomena of disengagement and separation.

Here, for example, a load of 1.25 Kg is retained for five seconds to the optical connector plug 10 in a connection state as illustrated in FIG. 8, and then, the disengagement states between the front plug housing and the rear extension cap were examined.

The results thereof are indicated in FIG. 5. As shown in FIG. 5, ten exemplary samples being examples 1 to 10 were prepared as the optical connector according to the present invention. The exemplary samples 1 to 5 respectively have three fitting recesses allowing to be engaged and fitted mutually with fitting projections. Then, the exemplary samples 6 to 10 respectively have two fitting recesses. Meanwhile, five optical connector plugs of the related art as described in the above cited literature were prepared as comparative examples 11 to 15. Then, each sample was measured under the above conditions (i.e., a weight of 1.25 kg retained continuously for five seconds in the vertical direction).

With all plugs having the structure of the present invention, the coupled state was maintained under the above measurement conditions without disengagement between the front plug housing and the rear extension cap. On the other hand, regarding traditional plugs as the comparative examples, disengagement occurs with the comparative examples 12, 13, 15 while disengagement was managed to be avoided barely with the comparative example 11. Further, the comparative example 14 became disengaged state halfway and is inappropriate to be used owing to occurrence of large connection loss.

As can be seen from the above rest results with predetermined load applied to the optical connector plug, when unforeseen force which is not expected is applied, it has been difficult for the conventional plugs which have the traditional structure to sufficiently complement the mechanical coupling due to engagement between the engagement openings and the engagement projections owing to a small thickness of the housing of the front plug housing. However, according to the structure of the present invention, it is possible to interdigitate and maintain strong coupling between the fitting projections and the fitting recesses and the optical connector plug of the present invention is prevented from getting the states of disengagement and separation of the both members.

In the above embodiments of the present invention, maintaining of the mechanical coupling, or join therebetween is improved by forming fitting projections and the fitting recesses at three positions for each member. However, the desired effects can be obtained even when the fitting projections and the fitting recesses are arranged at least at the side surfaces corresponding to the engagement openings and the engagement projections. Naturally, the mechanical coupling strength is improved as the number thereof is increased, as described in the embodiments. Thus, it is obvious that the present invention is not limited to the embodiments described above.

The invention claimed is:

1. An optical connector plug for accommodating a ferrule assembly to hold an optical fiber, comprising:
a first member; and
a second member being assembled with the first member;
the first member including an opening to insert and hold the ferrule assembly in a longitudinal direction, and having a fitting projection provided on at least one side wall thereof in the longitudinal direction;
the second member comprising a main portion, an elongating portion extended from the main portion, and a joining portion extended from the elongating portion, the second member having an opening formed in a longitudinal direction to insert and hold the ferrule assembly, and a longitudinal fitting recess provided on at least one side wall corresponding to the longitudinal fitting projection of the first member;
the joining portion of the second member being inserted into the opening of the first member, and the fitting projection of the first member and the fitting recess of the second member being interdigitated with each other and both the first member and the second member being tightly engaged; and
the first member being provided with an engagement opening at a rear portion of the fitting projection thereof, and the second member being provided with an engagement projection at a front end portion of the fitting recess corresponding to the engagement opening of the first member, and both the first and second members being joined by engaging the engagement opening with the engagement projection, and by interdigitating the fitting projection to the fitting recess.

2. The optical connector plug according to claim 1, wherein the fitting projection of the first member is swelled radially inward from an inner side wall of the opening portion, and the fitting recess of the second member is formed at outer side walls of the elongating portion and the joining portion.

3. The optical connector plug according to claim 1, wherein the fitting projection is formed respectively at both side walls of the first member, and the fitting recess is formed respectively at both side walls of the elongating portion and the joining portion of the second member.

4. The optical connector plug according to claim 3, wherein the fitting projection is formed at a bottom wall of the first member, and the fitting recess is formed at bottom walls of the elongating portion and the joining portion of the second member.

5. The optical connector plug according to claim 1, wherein the first member and the second member are formed respectively in an approximately quadrilateral shape, and are formed so as to be equal a thickness of the fitting projection to a depth of the fitting recess, and the both members are flush on wall surfaces of joining portions thereof at a time that the fitting projection and the fitting recess are engaged.

6. The optical connector plug according to claim 1, wherein the ferrule assembly held the ferrule is tightly equipped within an inner wall of an accommodating portion of the connector comprised of the longitudinal opening portions of the first member and the second member.

7. The optical connector plug according to claim 1, further comprising a stopper provided radially inwardly on an inner wall surface of a predetermined portion of the first member to engage with the ferrule assembly equipped with the ferrule.

8. The optical connector plug according to claim 1, wherein the fitting projection of the first member is longitudinally projected from an end of the wall of the opening which is interdigitated the joining portion of the second member;
the fitting recess of the second member is formed at an outer wall of the elongating portion formed between the main portion and the joining portion of the second member in a longitudinal direction from an end of the joining portion, and
both the first member and the second member are fixedly interdigitated each other by fitting the fitting projection of the first member and the fitting recess of the second member in case of assembling both the first member and the second member each other.

9. The optical connector plug according to claim 8, wherein a plurality of fitting projections are provided, and each fitting projection is formed on each side wall of the first member; and a plurality of fitting recesses are provided, and each fitting recess is formed in each side wall of the elongating portion of the second member.

10. The optical connector plug according to claim 9, wherein the fitting projection is formed on a bottom wall of the first member; and the fitting recess is formed in a bottom wall of the elongating portion of the second member.

11. The optical connector plug according to claim 8, wherein both of the first member and the second member are formed respectively in an approximately quadrilateral shape, a length of the fitting projection is equal to a length of the fitting recess, a width of the fitting projection is equal to a width of the fitting recess, and a thickness of the fitting projection is equal to a depth of the fitting recess; and outer wall surfaces of joint portions of the both members are to be flush with therebetween in a case that the fitting projection and the fitting recess are fitted.

12. The optical connector plug according to claim 8, wherein inner walls of a connector accommodating portion which is comprised of the longitudinal opening portions of the first member and the second member is formed to firmly install the ferrule assembly equipped with a ferrule.

13. The optical connector plug according to claim 12, wherein the first member is provided with a stopper directed radially inwardly at predetermined portion of an inner wall surface to engage with the ferrule assembly equipped with the ferrule.

* * * * *